Jan. 24, 1956 C. E. DREW 2,732,213
EXPANDING MANDREL CHUCK
Filed Sept. 8, 1953 2 Sheets-Sheet 1
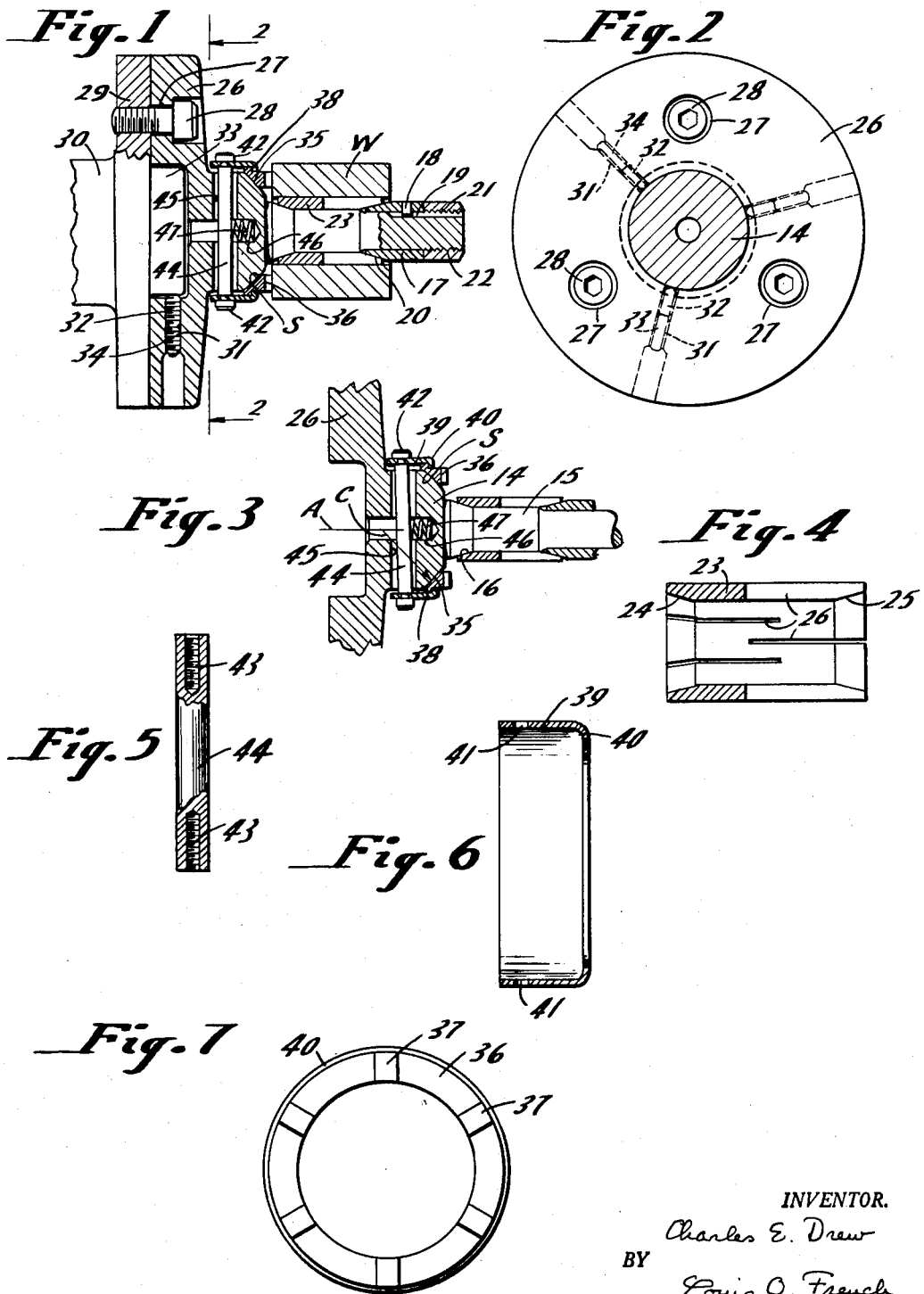

Jan. 24, 1956 C. E. DREW 2,732,213
EXPANDING MANDREL CHUCK
Filed Sept. 8, 1953 2 Sheets-Sheet 2
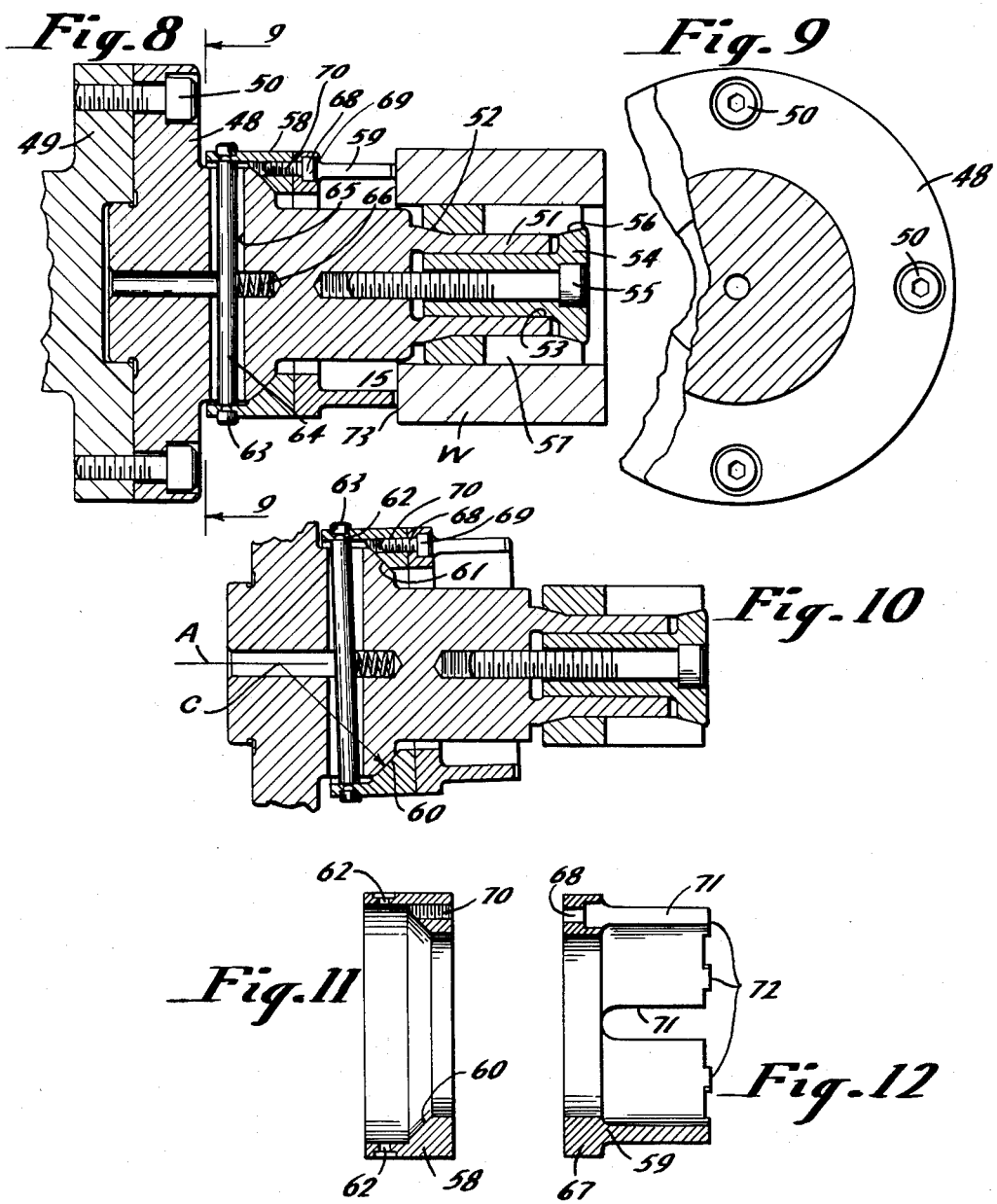
INVENTOR.
Charles E. Drew
BY
Louis O. French
Att'y.

United States Patent Office 2,732,213
Patented Jan. 24, 1956

2,732,213
EXPANDING MANDREL CHUCK

Charles E. Drew, Racine, Wis.

Application September 8, 1953, Serial No. 378,854

5 Claims. (Cl. 279—2)

The invention relates to chucks for carrying expanding mandrels.

In the manufacture of tubular work parts or parts provided with a central bore it is sometimes the practice to finish out the central bore on one machine or in one operation and then finish the exterior of the part in another operation by placing this part on an expanding mandrel secured or mounted on the headstock of a lathe or other machine tool. The object of the present invention is to provide a mandrel chuck for the second operation work above mentioned which takes work whose end or ends is or are unfinished and more particularly to associate with such a chuck a self-alining stop means to engage the back or unfinished end of the work while on the mandrel and hold the work against lengthwise movement while machining or finishing its exterior.

The invention further consists in the several features hereinafter described and more particularly defined by claims at the conclusion hereof.

In the drawings:

Fig. 1 is a vertical sectional view through a chuck embodying the invention;

Fig. 2 is a detailed vertical sectional view taken on the line 2—2 of Fig. 1;

Fig. 3 is a view similar to Fig. 1, parts being broken away and other parts shown in a different position;

Fig. 4 is a vertical sectional view through an expanding mandrel;

Fig. 5 is a view of a stop post, parts being broken away and parts being shown in section;

Fig. 6 is an enlarged vertical sectional view of a stop retainer member;

Fig. 7 is a front elevation view of a stop member;

Fig. 8 is a view similar to Fig. 1 showing certain modifications;

Fig. 9 is a detailed vertical sectional view taken on the line 9—9 of Fig. 8, parts being broken away;

Fig. 10 is a view similar to Fig. 8 showing the stop parts in a different position, parts being broken away;

Fig. 11 is an enlarged vertical sectional view of the mounting portion of the stop member shown in Fig. 8;

Fig. 12 is an enlarged vertical sectional view of a stop part.

Referring to Figs. 1 to 7, the chuck includes a spindle 14 having a mandrel receiving end 15 provided with a conical portion 16 and carrying a sleeve 17 slidably keyed thereto by the key 18 and key slot 19 and having a conical surface 20, said sleeve being adjustable lengthwise of said end 15 by abutting engagement with a collar 21 which has threaded engagement with the outer threaded end portion 22 of the end 15.

An expanding sleeve type mandrel 23 having conically faced ends 24 and 25 and slots 26 extending inwardly from said ends is adapted to be mounted on the spindle 14 so that the end 24 engages the conical portion 16 and the end 25 is engaged by the conical surface 20.

As the ends 24 and 25 and outer surface of the mandrel 23 are true surfaces of revolution relative to the longitudinal axis of the sleeve and the conical portions 16 and 20 are true surfaces of revolution relative to the axis of the spindle, the outer surface of the mandrel will run true with the spindle and will hold a tubular work piece, such as W, on the mandrel through expansion of its parts against the surface of the bore of the work piece.

For operating on the work piece the spindle must be rotated by connection with some kind of rotating drive member, usually the drive spindle of a lathe, milling machine, or other machine tool. As illustrative of one form of driving connection, I show the base of the spindle 14 as flanged to provide a base plate 26 having equidistantly circumferentially spaced holes 27 for receiving cap screws 28 which clamp said plate to the flanged portion 29 of a rotary drive member 30. For assisting in centering the axis of the spindle in line with the axis of the member 30, equidistantly spaced radially extending tapped holes 31 may be provided in the base 26 to receive set screws 32 engageable with a cylindrical boss 33 on the member 30 and held in adjusted position by a second set of set screws 34. Other forms of connection between the spindle 15 and its drive member may be used without departing from the invention.

The inventive subject matter of this case is concerned with a stop mechanism to limit the movement of the work piece W relative to the spindle especially where the work has an unfinished end surface. For this purpose a portion of the spindle 15 is formed to provide an annular spherical surface S whose center C is in the axis A of the spindle and upon which surface the conical or forty-five degree bevelled end 35 of a stop member 36 is free to position itself, said stop member having a line contact with said surface and having spaced multi-point contact with the unfinished end of the work. The stop member 36 is conveniently formed as a metal ring whose outer end is provided with equidistant circumferentially spaced stop surfaces 37 and whose rear end in addition to the conical surface 35 has an annular flange 38.

For holding the stop member 36 on the spindle and in operative relation to the work, a mounting ring 39 has a flanged end 40 engaging the flange 38 and diametrically disposed holes 41 to receive screws 42 which are mounted in the threaded ends 43 of a mounting rod 44 that extends through a diametrically disposed slot or hole 45 in the spindle which intersects with an axial hole 46 therein. A compression spring 47 is mounted in the hole 46 between its bottom end and the rod 44 so as to normally maintain said rod 44 in a position substantially normal to the axis of the spindle and consequently hold the stop surfaces 37 of the ring 36 normal to said axis. However, since the unfinished end of the work is not true with the axis, the stop member 36 is free to shift angularly relative to said axis to accommodate said surface and yet provide a spaced multi-point contact therewith, at least three of the six surfaces 37 being in abutting contact with the work, the member 36 automatically accommodating itself to the work piece, the spring 47 acting through the rod 44 and mounting ring 39 always acting to maintain contact between the spherical surface S of the spindle and the conical end 35 of the stop.

The construction shown in Figs. 8 to 13 shows certain modifications. The spindle 15 is here shown as having a flange 48 secured to a rotary drive member 49 by cap screws 50 and as having a tubular end 51 provided with a conical surface 52 and having a bore 53 to receive the shank of a headed member 54 secured to it by a cap screw 55 passing through said member 54 into threaded engagement with said spindle, the head having a conical surface 56. An expanding mandrel 57, similar to the mandrel 23, is held to the spindle by the conical surfaces 52 and 56.

The stop mechanism includes a pair of rings 58 and 59. The ring 58 has an annular conical or forty-five degree bevelled surface 60 in line contact with the spherically curved surface 61, similar to the surface S, formed on the spindle and is provided with diametrically disposed holes 62 to receive screws 63 which, as in the first form, are anchored in the ends of a mounting rod 64 that works in a diametrically disposed slot or hole 65 in the spindle and is engaged by a compression spring 66 mounted in a bore 66 in said spindle.

The ring 59 has a base portion 67 provided with equidistantly circumferentially spaced holes 68 to receive cap screws 69 that engage in threaded holes 70 in the ring 58. The outer part of the ring is slotted at 71 to accommodate the screws 69, and its outer end is provided with equidistant circumferentially spaced six stop surfaces 72 similar to the surfaces 37 to permit of a three point engagement with the unfinished end 73 of the work W.

The conical surfaces 35 and 60 are true surfaces of revolution relative to the axis of stop ring 36 and ring 58, respectively.

The above described stop mechanism functions similarly to the first described form to limit the movement of the work relative to the mandrel 23 and the spindle and automatically compensate for inaccuracies in the end surface of the work engaged by said mechanism.

It is to be noted that while the drawings show a straight conical surface 35 or 60 engaging the conical surface S or 61, the surfaces 35 or 60 may be spherically curved conical surfaces mating with the conical surface S or 61 without departing from the invention. The straight conical surfaces for the stop members are easier to make than the spherically curved conical surfaces.

I desire it to be understood that this invention is not to be limited to any particular form or arrangement of parts except in so far as such limitations are included in the claims.

What I claim as my invention is:

1. In a chuck, the combination with a spindle provided with means for mounting an expanding mandrel thereon to receive a work piece having a finished bore and an unfinished end surface, of stop mechanism for said work piece including a movable stop adapted for spaced three-point contact with said unfinished surface, and mounting means for said stop including a spherically curved surface on said spindle engaged by said stop and permitting it to oscillate about a point in the central axis of said spindle to automatically accommodate said stop to said unfinished surface.

2. In a chuck, the combination with a spindle provided with means for mounting an expanding mandrel thereon to receive a work piece having a finished bore and an unfinished end surface, of a spherically curved surface on said spindle whose center lies in the axis of said spindle, and a stop having a surface engageable with the curved surface of said spindle, and means for maintaining the engagement of said surfaces, said stop having circumferentially spaced surfaces for contact with said unfinished surface of the work.

3. In a chuck, the combination with a spindle provided with means for mounting an expanding mandrel thereon to receive a work piece having a finished bore and an unfinished end surface, of an annular spherically curved surface on said spindle whose center lies in the axis of said spindle, a work stop having a surface engageable with said curved surface and having circumferentially spaced stop surfaces, a rod connected with said stop and extending loosely through a diametrically disposed opening in said spindle, and a spring interposed between said spindle and the intermediate portion of said rod to exert pressure on said rod to maintain the surface of said stop in engagement with said curved surface and permitting shifting of said stop relative to said surface to accommodate the three point engagement of said stop surfaces with said unfinished surface.

4. The chuck as defined in claim 3 wherein the stop is formed of two ring members, one of which is connected to said rod at diametrically opposite points, and the other of which is provided with said stop surfaces.

5. The chuck as defined in claim 3 wherein the stop is formed of two ring members, one of which is connected to said rod at diametrically opposite points, and the other of which is provided with said surface engaging said curved surface and with said stop surfaces.

References Cited in the file of this patent

UNITED STATES PATENTS

| | | |
|---|---|---|
| 2,469,873 | Ernest | May 10, 1949 |
| 2,663,124 | Somle et al. | Dec. 22, 1953 |